2,727,935
Patented Dec. 20, 1955

United States Patent Office

2,727,935
RUBBER FILLER

Harry Kloepfer, Frankfurt am Main, Germany, assignor to Deutsche Gold- und Silber-Scheideanstalt vormals Roessler, Frankfurt am Main, Germany No Drawing. Application October 20, 1950,
Serial No. 191,318

Claims priority, application Germany October 31, 1949

2 Claims. (Cl. 260—765)

The present invention relates to an improved inorganic filler for natural and synthetic rubber compositions and a method of producing the same and more particularly to an improved filler primarily composed of aluminum oxide.

It is an object of the invention to provide an improved aluminum oxide containing filler for rubber compositions.

It is a further object of the invention to provide an improved process for the production of an aluminum oxide containing filler from aluminum sulfates for rubber compositions.

It is still another object to provide aluminum oxide filled rubber composition of high tensile strength.

In the past it has been proposed to employ aluminum oxide as a filler for rubber compositions, such aluminum oxide being prepared by calcining ammonia alum or by a wet process from alumina gel.

In accordance with the invention, it has been unexpectedly discovered that an aluminum oxide filler of high activity is obtained when such filler is prepared by heating an alum such as aluminum sulfate or ammonium aluminum sulfate only to such an extent that a certain small quantity of $SO_3$ is still retained in the product. It was found that aluminum oxide products obtained by calcining such alum and still containing from 1% to 5%, preferably, 2% to 3%, possess exceptionally good properties as fillers for rubber compositions.

The improvement obtained with an aluminum oxide filler in accordance with the invention, is illustrated by the following examples:

Example 1

A rubber vulcanizate produced according to the following receipe:

| | |
|---|---|
| Natural rubber | 100 |
| Filler (in accordance with the present invention), i. e. aluminum oxide with a content of 3.5% $SO_3$ | 100 |
| Stearic acid | 1.8 |
| Pine tar | 1.0 |
| Phenyl-β-naphthylamine | 1.4 |
| Zinc oxide | 7.0 |
| Magnesium oxide | 1.8 |
| Accelerator | 1.4 |
| Sulfur | 1.4 | with a vulcanization temperature of about 143° centigrade resulted in the following optimum testing values:

| | |
|---|---|
| Tensile strength | 275 kg./cm.$^2$. |
| Elongation at rupture | 696%. |
| Elasticity | 62%. |
| Shore hardness | 54. |
| Impact resistance | 27.8 kg./cm. |
| Abrasion | 130 mm.$^3$. |

Example 2

According to the aforementioned recipe but with the difference that as a filler aluminum oxide was used which was practically free from $SO_3$, the following optimum testing values were obtained:

| | |
|---|---|
| Tensile strength | 191 kg./cm.$^2$. |
| Elongation at rupture | 566%. |
| Elasticity | 60%. |
| Shore hardness | 59. |
| Impact resistance | 20.1 kg./cm. |
| Abrasion | 212 mm.$^3$. |

The comparison of both these examples clearly shows the superiority of aluminum oxide containing $SO_3$ in accordance with the present invention, especially in respect of tensile strength, impact resistance and particularly as concerns abrasion resistance, all qualities which are most important in connection with the production of natural and synthetic rubber compositions.

It was found especially advantageous to carry out the calcination of the alum in accordance with the invention to produce the active filler containing a few per cent of retained $SO_3$ while passing air, preferably moist air, over the material being calcined. Also, it has been found advantageous to carry out the calcination at temperatures below 1000° C., preferably in the neighborhood of 900° C. The passage of air or moist air over the material during calcination materially expedites the calcination, for example, when moist air is passed over the alum during calcination, an aluminum oxide product containing about 3.5% of retained $SO_3$ is obtained in 2 hours, whereas when the moist air is not employed 3½ to 4 hours are required until an aluminum oxide of the same $SO_3$ content is obtained.

The following example serves to illustrate a preferred method for the production of the aluminum oxide filler in accordance with the invention.

30 kilograms of previously dehydrated aluminum sulfate were supplied per hour to a rotary furnace having an internal diameter of 45 centimeters and a length of 4 meters. The furnace was rotated 3 revolutions per minute and was heated to 925° C. while 60 cubic meters per hour of moist air, saturated with water vapor at 90° C., were passed therethrough. The rate at which the furnace charge passed through the rotary furnace was regulated so that it remained in the furnace for two hours. The output of the furnace was about 10 kilograms of aluminum oxide containing 3% of $SO_3$.

Aluminum oxide of substantially the same quality and content of $SO_3$ was obtained when no moist air was passed through the furnace but the furnace charge required about four hours treatment before the $SO_3$ content was reduced to the amount desired.

The $SO_3$ containing gas resulting from the calcination can expediently be employed for the production of sulfuric acid.

The aluminum oxide products obtained in accordance with the invention by the incomplete calcination of aluminum sulfates are substantially better products than the previously employed practically $SO_3$ free aluminum oxide obtained by complete calcination. In comparison with the products obtained by a wet process from alumina gel, the aluminum oxide products, in accordance with the invention have the advantage of substantial uniformity of their excellent properties when employed as a filler for rubber compositions.

I claim:

1. A rubber composition containing a filler consisting of a calcined aluminum sulfate product composed essentially of $Al_2O_3$ containing 1% to 5% of $SO_3$.

2. A rubber composition containing a filler consisting of a calcined aluminum sulfate product composed essentially of $Al_2O_3$ containing 2% to 3% of $SO_3$.

(References on following page)

References Cited in the file of this patent

UNITED STATES PATENTS

| | | |
|---|---|---|
| 455,611 | Emanuel | July 7, 1891 |
| 1,070,324 | Chappell | Aug. 12, 1913 |
| 1,132,736 | Schwahn | Mar. 23, 1915 |
| 1,252,384 | Barnett et al. | Jan. 8, 1918 |
| 1,710,481 | Keller | Apr. 23, 1929 |
| 1,752,599 | Kjellgren | Apr. 1, 1930 |
| 2,013,670 | Robinson | Sept. 10, 1935 |
| 2,476,979 | Hoeman | July 26, 1949 |

FOREIGN PATENTS

| | | |
|---|---|---|
| 49,145 | France | Nov. 7, 1938 |